(12) United States Patent
Kostamo

(10) Patent No.: US 8,921,797 B2
(45) Date of Patent: Dec. 30, 2014

(54) LEAKAGE CURRENT COLLECTION STRUCTURE AND A RADIATION DETECTOR WITH THE SAME

(75) Inventor: Pasi Kostamo, Espoo (FI)

(73) Assignee: Oxford Instruments Analytical Oy, Espoo (FI)

( * ) Notice: Subject to any disclaimer, the term of this patent is extended or adjusted under 35 U.S.C. 154(b) by 258 days.

(21) Appl. No.: 13/527,970

(22) Filed: Jun. 20, 2012

(65) Prior Publication Data

US 2013/0341520 A1 Dec. 26, 2013

(51) Int. Cl.
*G01T 1/24* (2006.01)

(52) U.S. Cl.
USPC .................................... 250/370.14; 250/428

(58) Field of Classification Search
USPC .................................... 250/370.14; 257/428
See application file for complete search history.

(56) References Cited

U.S. PATENT DOCUMENTS 7,238,949 B2 * 7/2007 Struder et al. ............. 250/370.1

* cited by examiner

*Primary Examiner* — David Porta
*Assistant Examiner* — Kenneth J Malkowski
(74) *Attorney, Agent, or Firm* — Wood, Phillips, Katz, Clark & Mortimer

(57) ABSTRACT

A radiation detector comprises a piece of semiconducting material. On its surface, a number of consecutive electrode strips are configured to assume electric potentials of sequentially increasing absolute value. A field plate covers the most of a separation between a pair of adjacent electrode strips and is isolated from the most of said separation by an electric insulation layer. A bias potential is coupled to said field plate so that attracts surface-generated charge carriers.

12 Claims, 5 Drawing Sheets

A-A

B-B

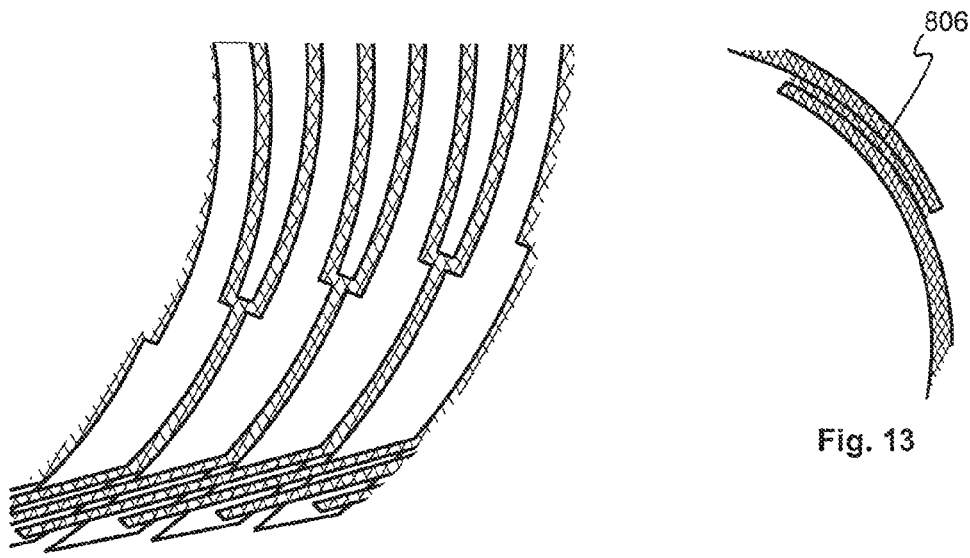
Fig. 13
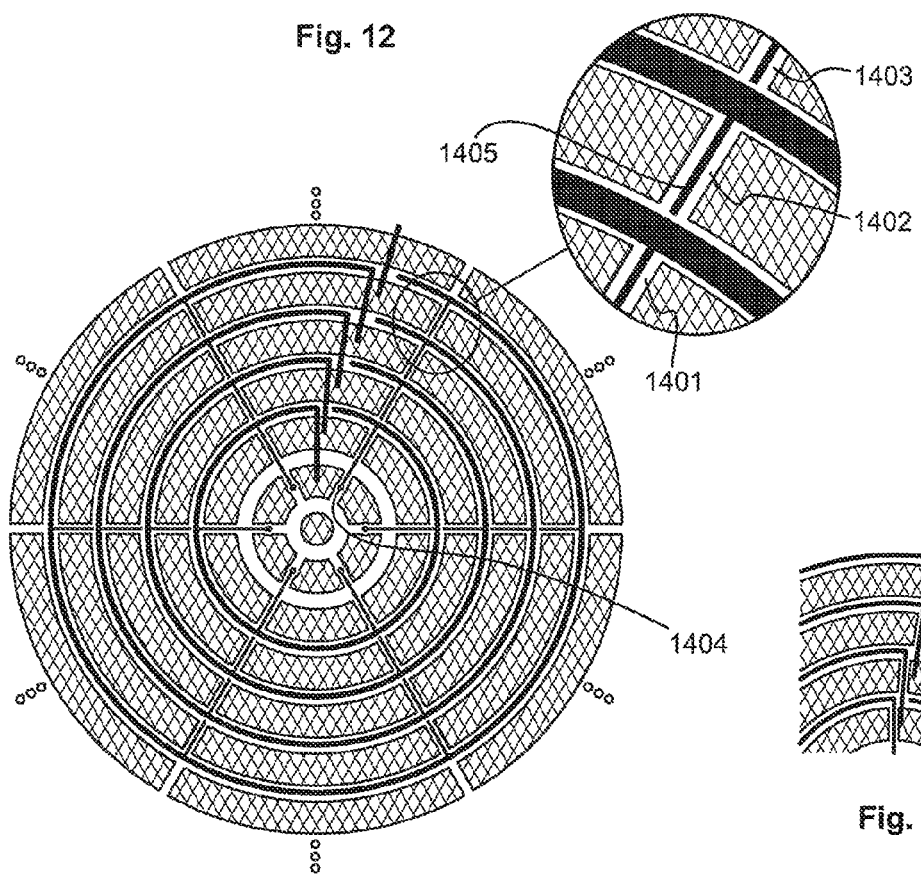
Fig. 12
Fig. 14
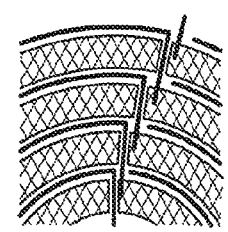
Fig. 15

LEAKAGE CURRENT COLLECTION STRUCTURE AND A RADIATION DETECTOR WITH THE SAME

TECHNICAL FIELD

The invention concerns in general the field of semiconductor devices. In particular the invention concerns the generation and collection of surface-generated leakage currents in semiconductor radiation detectors that have a number of electrodes at different electric potentials.

BACKGROUND OF THE INVENTION

FIG. 1 illustrates schematically a simplified, partially cut-out silicon drift detector (SDD), which is an example of a semiconductor radiation detector used to detect electromagnetic radiation, particularly X-rays. A bulk layer 101 of semiconductor material receives and absorbs the radiation, which causes free charge carriers to appear. One surface of the bulk layer 101 comprises an arrangement of concentric p-type implantation rings, of which ring 102 is shown as an example. The concentric rings are arranged to have electric potentials of gradually increasing absolute value, so that if the potential at the center of the SDD is only some volts, the outermost ring may have a potential of e.g. −150 V. The number of rings is overly simplified in FIG. 1; in a real-life detector there may be dozens of rings.

Together with a cathode layer 103 on the opposite surface of the bulk layer, the concentric rings create, within the bulk layer, an internal electric field that drives the radiation-induced electrons towards the center of the SDD. At or close to the center, an anode is located for collecting the radiation-induced electrons. The SDD of FIG. 1 comprises an integrated field-effect transistor (FET), the electrodes of which are shown as implantations 104, 105, and 106. The innermost implantation ring, i.e. the one closest to the FET, is the anode, from which a connection 107 is made to the gate of the FET. Alternative structures are known, in which the anode is at the very center of the SDD, and an external FET is coupled to the anode for example by bonding a separate FET chip to appropriate parts of the SDD chip.

A circular SDD with the anode and FET at or close to the center of the SDD chip has the inherent disadvantage that some of the measured radiation will hit the FET, which may disturb its operation and cause radiation damage to the crystalline material from which the FET is made. In a structure like that in FIG. 1, the FET will also reserve some active surface area. As an alternative, the so-called droplet-formed detector, also known as SD³ or SDDD (Silicon Drift Detector Droplet) has been proposed. FIG. 2 illustrates schematically the surface of a droplet-formed detector, again with the number and relative size of the structural elements deliberately distorted in favor of graphical clarity. The implantation rings, the stepwise increasing potential of which create the electric field, are asymmetric so that their arched form is relatively wide on one side (on the left in FIG. 2) but narrow and pointed on the other (on the right in FIG. 2). The outermost implantation ring used for this purpose is shown as 201.

The anode region is generally shown as 202 and it may comprise conductive patches (like in FIG. 2) for bonding an external FET thereto, and/or implantations that at least partly constitute an integrated detection and amplification element such as a FET. The asymmetric form of the implantation rings brings the anode region 202 out of the active area of the detector, so it is much less exposed to radiation than in the structure of FIG. 1, and also does not cause any dead zone in detection.

A problem that may occur in drift detectors is the mixing of surface-generated charge carriers with the signal charge. A prior art publication W. Chen et al.: "Large Area Cylindrical Silicon Drift Detector", IEEE Transactions on Nuclear Science, vol. 39, no. 4, pp. 619-628, 1992, discusses the problem. Chen suggests that the presence of fixed positive charge in an oxide layer on the surface of the detector chip, together with a "river" of radially oriented gaps in the electrode rings, may hold the surface-generated electrons close to the surface and guide them towards the center of the detector, where they are collected through a dedicated electrode. A drawback of Chen's solution is that it requires careful control of the gaps in the electrode rings. It also means that the amount and distribution of the so-called "oxide charge" must be selected in a specific way that may not be optimal from other viewpoints of designing the detector.

SUMMARY OF THE INVENTION

According to an aspect of the invention, there is provided a semiconductor radiation detector in which surface-generated charge carriers can be collected efficiently. According to another aspect of the invention, the collection of surface-generated charge carriers can be accomplished with simple structures that are robust in terms of reliability in manufacturing and use. According to yet another aspect of the invention there is provided a structural solution for collecting surface-generated charge carriers that is easily adaptable to semiconductor radiation detectors of various forms.

Advantageous objectives of the invention are fulfilled with a structure in which field plates are used above the separations between drift electrodes, which field plates are biased with electric potentials that differ sufficiently from the immediate surroundings to attract surface-generated charge carriers. As an example, the field plates may get their electric potential through a hop-over connection from an electrode that is further away than those electrodes that define the separation covered by the field plate.

A radiation detector according to the invention is characterized by the features recited in the independent claim directed to a radiation detector.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 12 illustrates other kind of hop-over connections in a droplet-formed drift detector,
FIG. 13 illustrates extending a field plate over a bridge connection,
FIG. 14 illustrates the use of river structures in a round drift detector,
and FIG. 15 illustrates an alternative way of aligning a river structure.

DETAILED DESCRIPTION OF EMBODIMENTS OF THE INVENTION

Figure 1:
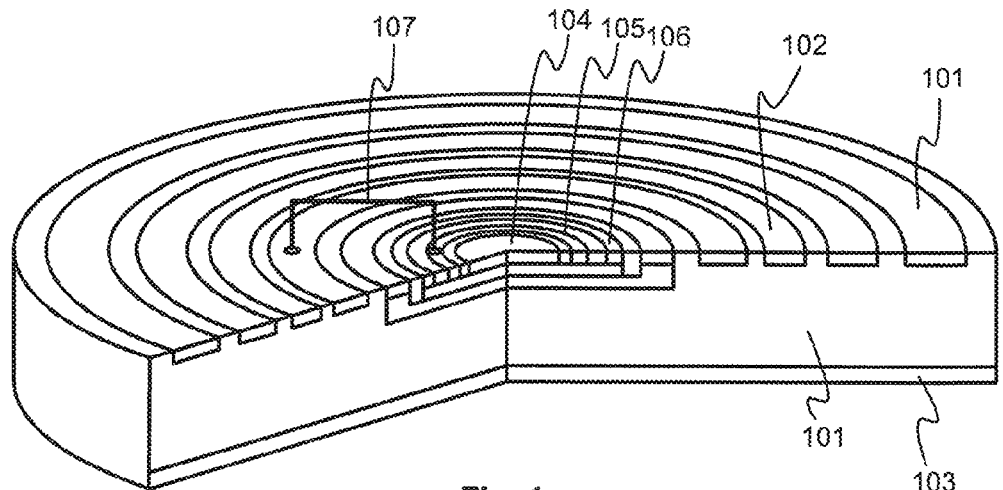
FIG. 1 illustrates a silicon drift detector.
Figure 2:
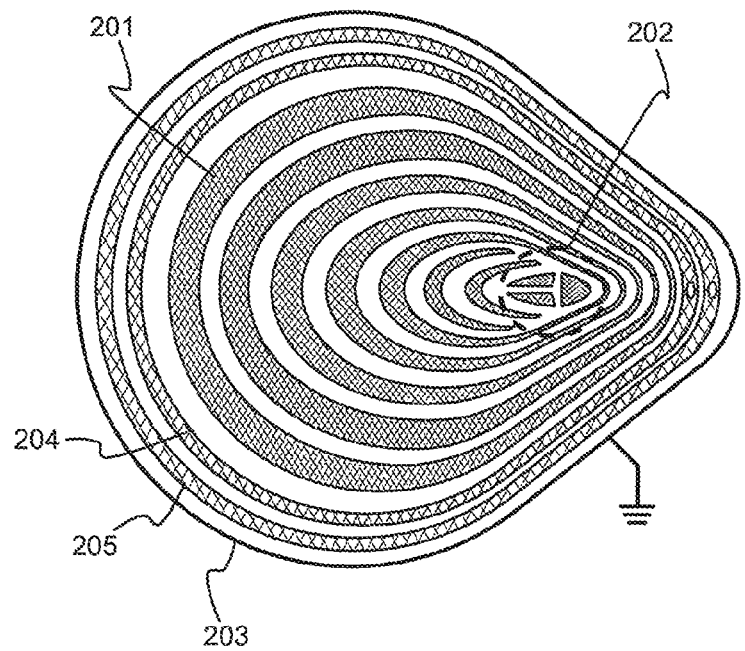
FIG. 2 illustrates a droplet-formed silicon drift detector.
Figure 3:
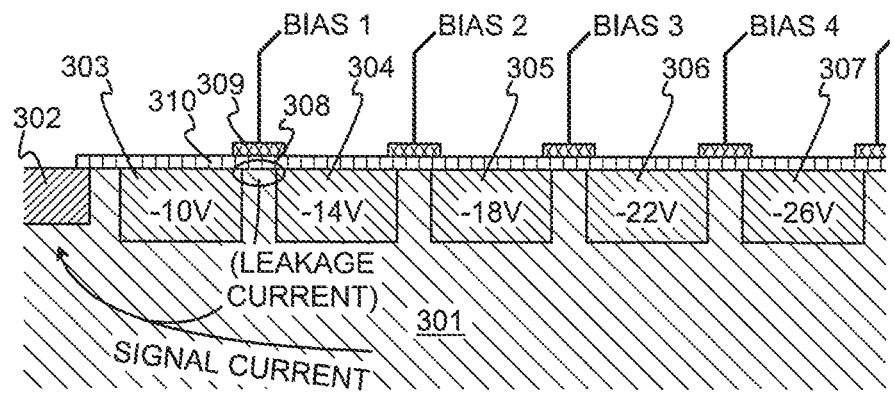
FIG. 3 illustrates the concepts of surface current and field plates.

FIG. 3 is a schematic cross section of a part of a semiconductor radiation detector, particularly a drift detector. The piece 301 of semiconductor material comprises an n-type anode 302 and a number of consecutive p-type drift electrodes 303, 304, 305, 306, and 307. Within each separation between consecutive drift electrodes, at and/or close to the surface of the piece of semiconductor material, is a region in which so-called surface currents, surface-related leakage currents, or surface-generated charge carriers are generated. Region 308 is shown as an example. The generation of surface-generated charge carriers is an inevitable physical fact and cannot be avoided; merely, the design of the semiconductor radiation detector should be such that surface-generated charge carriers interfere as little as possible with the generation and measurement of radiation-induced charge carriers (i.e. the so-called signal charges).

A so-called field plate 309 is located adjacent to the separation between consecutive drift electrodes and electrically isolated therefrom by an electric insulation layer 310. A connection exists for each field plate, through which the respective field plate is configured to assume a bias potential. The electric potentials of the drift electrodes are different, so also the bias potentials BIAS 1, BIAS 2 ... for the field plates must differ from each other. The electric potential of the field plate must also differ sufficiently from its immediate surroundings so that the aim of attracting surface-generated charge carriers is accomplished effectively within each separation. Since the basic operating principle of a drift detector requires the electric potentials of the drift electrodes to be of the same sign as the signal charge (and, consequently, of the same sign as the surface-generated charge), the electric potential of the field plate must in particular be smaller in absolute value than that of the adjacent electrode strips.

Figure 4:
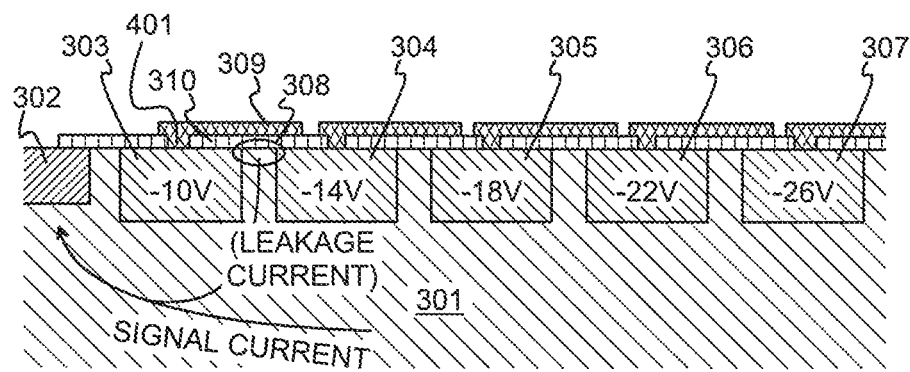
FIG. 4 illustrates a possibility of biasing the field plates.

FIG. 4 illustrates one possibility of biasing the field plates. In the arrangement of FIG. 4 the conductive material that constitutes the field plate extends to one side to make an electric connection between the field plate and the drift electrode on the inner side of the separation. Said connection is most easily made by arranging an opening in the electric insulation layer 310. As an example, FIG. 4 shows the opening 401, through which the metallization that forms the field plate 309 makes contact with the drift electrode 303. Due for the conductive connection, the field plate assumes the same electric potential as the drift electrode on the inner side of the separation, which should attract the surface-generated charge carriers sufficiently in order to keep them from mixing with the signal charges. A prior art publication A. Bischoff et al: "Breakdown protection and long-term stabilization for Si-detectors", Nuclear Instruments and Methods in Physics Research A326 (1993), pp. 27-37, suggests a so-called overlapping gate structure, some features of which roughly resemble the structure illustrated in FIG. 4.

The electric potential of the field plate 309 is −10 V, because it is in direct galvanic connection with the inner drift electrode 303 that defines one side of the separation covered by the field plate 309. In general, since the absolute value of electric potential of the drift electrodes is thought to increase at intervals of 4 volts in FIG. 4, the electric potential of a field plate is between 0 and 4 volts more positive than the electric potential of the adjacent drift electrodes that define the separation. The relatively small difference in electric potential may not suffice to draw all surface-generated charge carriers (here: electrons) towards the field plate, so some of them may leak out through the downward route and contribute to the leakage current illustrated in FIG. 4. According to an embodiment of the present invention, the field plate should provide a significant potential base over the whole of the separation.

Figure 5:
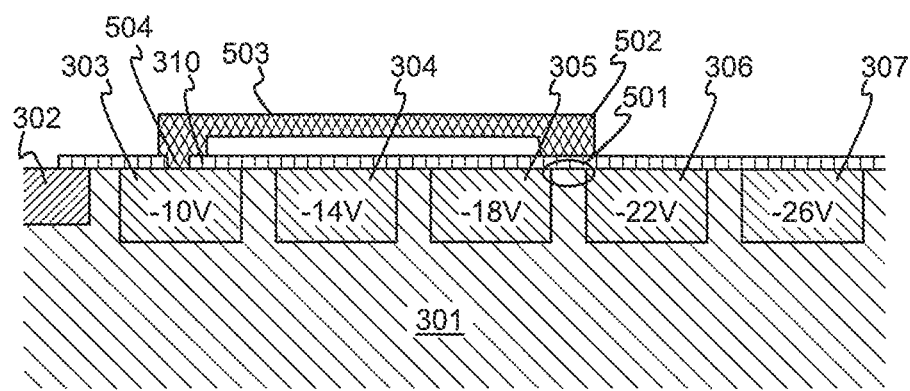
FIG. 5 illustrates a hop-over connection to a field plate.

FIG. 5 illustrates the principle of so-called hop-over connections. The radiation detector comprises a piece of semiconducting material, generally designated as 301. An anode 302 is also illustrated in FIG. 5, in a similar fashion as in FIGS. 3 and 4. On a surface (here: the upper surface) of the piece of semiconducting material, there are a number of consecutive electrode strips 303, 304, 305, 306, and 307. They are consecutive in the sense that going in a direction that is generally perpendicular to a longitudinal direction of the electrode strips (here: from left to right or from right to left), one crosses several electrode strips, one after the other. In many applications related to drift detectors, the electrode strips may be annular or arc-formed, so that an outer electrode strip at least partly encircles all inner electrode strips and an anode region. In such cases the electrode strips are consecutive from inner to outer ones (or vice versa). The electrode strips 303, 304, 305, 306, and 307 may be formed as suitably doped, strip-formed regions of the piece of semiconducting material 301, and/or they may comprise metallic or otherwise conductive coatings on the surface of the piece of semiconducting material 301.

The electrode strips 303, 304, 305, 306, and 307 are configured to assume electric potentials of sequentially increasing absolute value. Practical ways of making a number of consecutive electrode strips assume such electric potentials are discussed in more detail later. In a drift detector where the signal charges are electrons, the electrode strips are configured to assume increasingly negative electric potentials in the direction from inner towards outer electrode strips. In the simplified example of FIG. 5, the electric potentials of the electrodes 303, 304, 305, 306, and 307 are −10 V, −14 V, −18 V, −22 V, and −26 V respectively.

A pair of adjacent electrode strips defines a separation between them. In particular we may consider the separation between the pair of adjacent electrode strips 305 and 306, the surface region of which is illustrated as 501. A, field plate 502 covers the most of said separation and is isolated from the most of it by an electric insulation layer, which here is part of an essentially continuous electric insulation layer 310 on the surface of the piece of semiconductor material 301. Exceptions, due to which we use the descriptor "the most of", will be discussed in more detail later.

A hop-over connection 503 couples the field plate 502 electrically to one of the consecutive electrode strips that is further away from said separation than any of the pair of adjacent electrode strips 305 and 306 that define the separation. In the example of FIG. 5, the hop-over connection 503 couples the field plate 502 electrically to the leftmost electrode strip 303. The electric connection goes through an opening in the electric insulation layer 310 at the location shown as 504, so that a galvanic connection exists between the field plate 502 and the electrode strip 303. Thus the electric potential of the field plate 502 is the same as that of the electrode strip to which it is connected through the hop-over connection 503, here −10 V.

The designation "hop-over connection" is a name that is used here to underline the fact that the electric potential of the field plate 502 does not come from either of the adjacent electrode strips, between which is the separation that the field plate 502 covers. The electric potential "hops over" from an electrode strip further away. Assuming a hop-over connection over two electrode strips, and a regular increase of 4 volts of the absolute value of electric potential between electrode strips, the potential difference between the field plate 502 and the adjacent electrode strips 305 and 306 is between 8 and 12 volts. This is a much higher potential difference than in the structure of FIG. 4, and consequently much more effective in collecting the surface-generated charge carriers within the region 501.

The air gap, which is symbolically illustrated between the hop-over connection 503 and the electric insulation layer 310 in FIG. 5, is not needed in practice. It is shown here only to underline the fact that the hop-over connection 503 neither constitutes nor is connected to any field plates that would cover the separations between electrode rings 303 and 304, or 304 and 305.

As such, the biasing of the field plates that is illustrated in FIG. 3 could be accomplished in many ways. For example, one could create a chain of biasing contacts along an edge of the detector or at some other part where they do not interfere with the detecting function, and draw a connection between each field plate and its respective biasing contact. However, since a series of suitable electric potentials may exist anyway in the electrode strips, using a (hop-over) connection to a suitably selected electrode strip involves advantages like simplicity and robustness.

Figure 6:
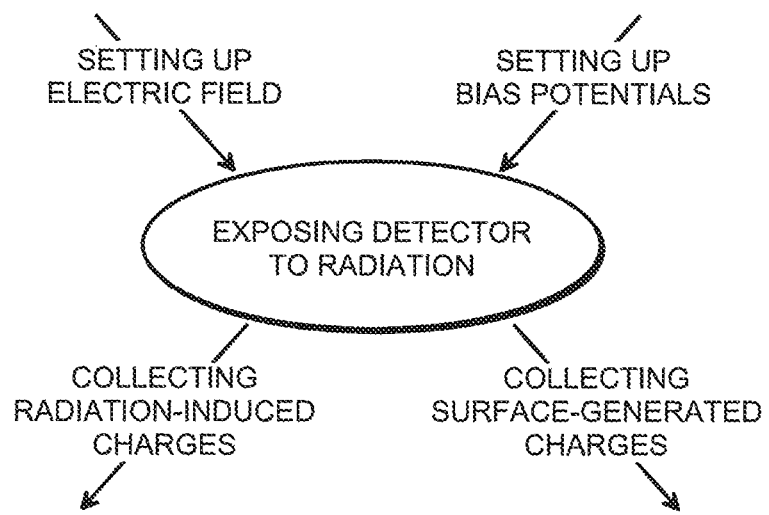
FIG. 6 illustrates a method.

FIG. 6 illustrates schematically a method for detecting electromagnetic radiation according to an embodiment of the invention. A detector, which comprises a piece of semiconducting material, is exposed to the radiation to be detected and measured. The illustrated step of collecting radiation-induced charges comprises guiding the radiation-induced charge carriers towards a detection point in the piece of semiconducting material with an electric field that is induced within the piece of semiconducting material by the electric potentials of sequentially increasing absolute value in a number of consecutive electrode strips. The step of collecting surface-generated charges comprises collecting surface-generated charge carriers in a separation between a pair of adjacent ones of said electrode strips. Said collecting is accomplished with the electric potential of a field plate that covers at least the most of said separation and is electrically isolated from at least the most of said separation. The electric potential of said field plate is smaller in absolute value than the electric potential of any of said pair of adjacent ones of said electrode strips The preparatory step of setting up the electric field comprises for example coupling the first and last ones of the electrode strips to desired electric potentials and allowing the intermediate electrode strips to assume electric potentials through electric couplings between them. The illustrated preparatory step of setting up the bias potentials may comprise for example obtaining the electric potential to each field plate from one of said consecutive electrode strips that is further away from the separation covered by that field plate than any of said pair of adjacent electrode strips.

Figure 7:
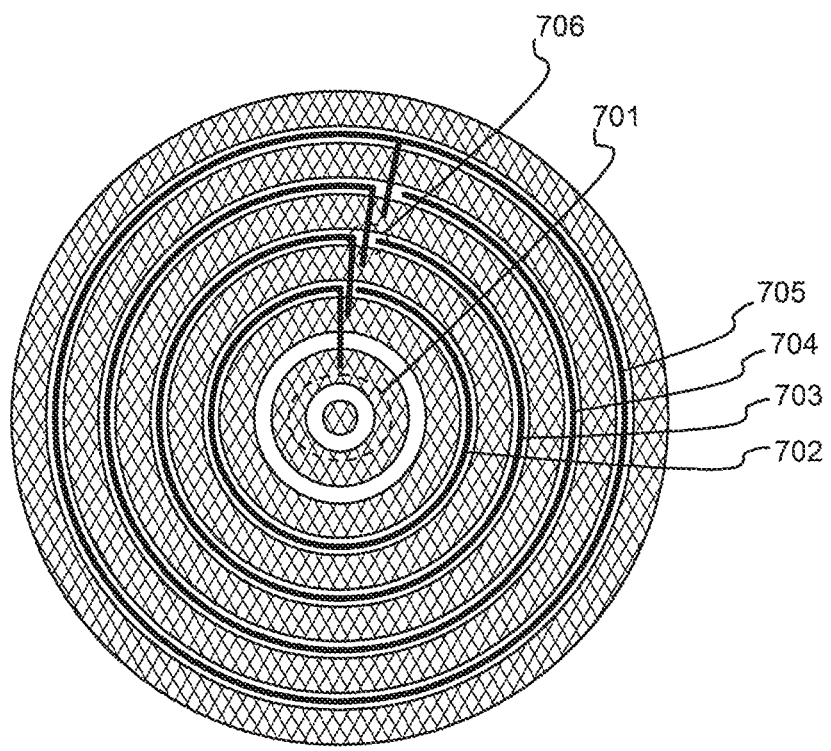
FIG. 7 illustrates field plates with hop-over connections.

FIG. 7 illustrates schematically a round drift detector, in which at least some of the electrode strips are annular field electrodes that encircle an anode region 701 at the center of the round drift detector. Not all electrode strips are necessarily drift electrodes; close to the center there may be one or more electrode strips that are associated with the anode region, and close to the edge there may be one or more electrode strips that act as guard rings that controllably decrease the absolute value of electric potential towards the edge of the piece of semiconductor material. Four field plates 702, 703, 704, and 705 are schematically shown, each covering the most of a separation between a pair of adjacent electrode strips. The electric insulation layer that isolates the field plates from their respective separations is taken to be transparent in FIG. 7, so that the electrode strips are visible. The electrode strips are illustrated exaggeratedly narrow in their transversal direction in FIG. 7, because otherwise it could be difficult to perceive the separations between adjacent electrode strips.

A hop-over connection exists for each of the four field plates 702, 703, 704, and 705. The hop-over connection couples the respective field plate to a respective one of the consecutive electrode strips that is further away from the respective separation than any of those electrode strips that define said separation. Each of the hop-over connections is in the same direction (here: inwards) with respect to the sequential order of the electrode strips.

FIG. 7 illustrates one reason why a field plate may be said to cover only "the most of" a separation, particularly if all field plates and their hop-over connections are implemented in a single layer of the structure. The hop-over connection(s) of one or more outer field plates may need to cross over the separation covered by an inner field plate. For example at location 706, a gap in the field plate 703 lets the hop-over connection to field plate 704 pass through. In the exemplary embodiment of FIG. 7, each hop-over connection reaches over the same number (here: one) of intermediate electrode strips in the sequential order of electrode strips. For geometrical reasons, this is also the largest number of hop-over connections that must pass through the gap left in each but the outmost field plate.

If the accepted level of complexity of the layer structure allows, it is possible to make hop-over connections that "hop over" also intermediate field plates without requiring a gap in them. It is also possible to use wire bonding or other techniques that are not completely bound to the use of stacked layers on the surface of the piece of semiconductor material to implement the hop-over connections. However, in many cases it is more advantageous to use just layers and also to keep the required number of different layers as small as possible, so that e.g. all field plates and hop-over connections are made within the same planar layer.

Figure 8:
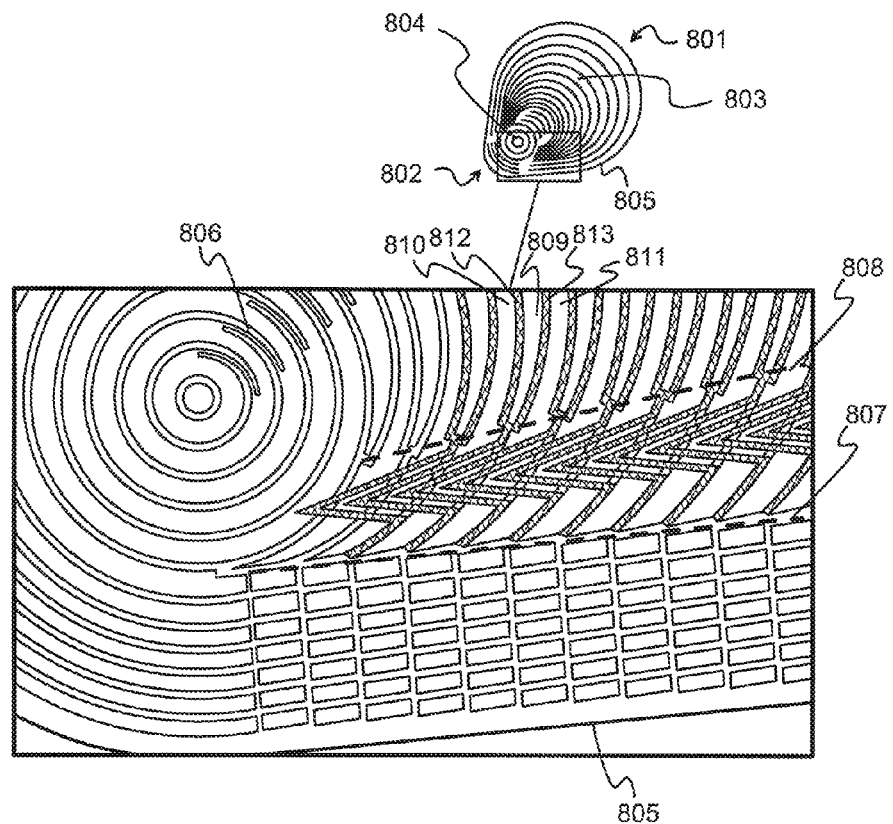
FIG. 8 illustrates hop-over connections in a droplet-formed drift detector.

FIG. 8 illustrates an embodiment of the invention in which the semiconductor device is a droplet-formed drift detector. It comprises a wide end 801 and a pointed end 802, so that the active area 803 is located within (or closer to) the wide end, and the anode region 804 is located within (or closer to) the pointed end, outside said active area. The edge of the piece of semiconducting material is illustrated as 805.

The partial enlargement in FIG. 8 shows an example of how the electrode strips are configured to assume their different electric potentials. Each pair of consecutive electrode strips is linked together by a narrow conductive bridge of certain length, of which bridge 806 is shown as an example. The specific conductivity and physical dimensions of each bridge are selected so that the bridge has a desired resistance, so that the electrode strips effectively constitute a resistor-linked chain. Electric potentials only need to be specifically coupled to the first and last electrodes in the chain, after which the resistor links between them takes care of setting the electric potential of each intermediate drift electrode to the appropriate value. Making the conductive bridge arc with almost the same radius of curvature as the limiting edges of the electrode strips it links together allows making the conductive bridge sufficiently long, so that the desired resistance is achieved without having to make the conductive bridge prohibitively narrow or without having to produce variations in the doping concentration along the length of the conductive bridge.

All but the few innermost electrode strips are crescent-formed instead of annular in the droplet-formed drift detector of FIG. 8. Crescent-formed electrode strips may be said to partially encircle an anode region of the droplet-formed drift detector. The center of curvature is not the same for all limiting edges of the crescent-formed electrode strips but changes little by little, for each outer edge and outer electrode strip, towards the wide end on a line of symmetry that links the wide end and pointed end together. For this reason the very ends of the crescent-formed electrode strips would become very narrow, if all crescent-formed electrode strips had their ends located on or close to the same imaginary line 807. For this reason every second crescent-formed electrode strip is of a shorter kind, with an end located on or close to another imaginary line 808. An electrode strip 809 is an example of an electrode strip of the shorter kind.

Figure 9:
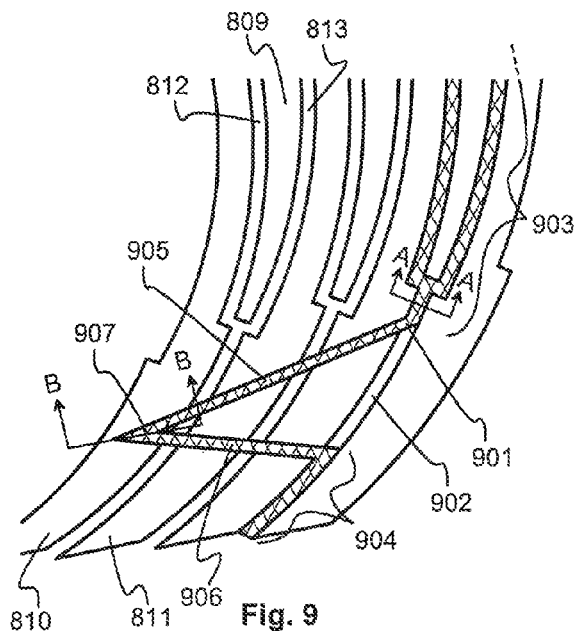
FIG. 9 illustrates a detail of the structure of FIG. 8.

Thus, in the geometry shown in FIG. 8, also a separation defined by two electrode strips that are adjacent at their ends (see e.g. electrode strips 810 and 811) branches into two separation branches 812 and 813, between which the further (shorter) electrode strip 809 is located. FIG. 9, where only some of the crescent-formed electrode strips and only one field plate with its hop-over connection(s) are shown for reasons of graphical clarity, illustrates how also the field plate 901 branches in its upper right part, in conformity with the branching separation 902. As a result, branches of the field plate cover the respective separation branches.

The electrode-strip-and-field-plate structure, details of which are illustrated in FIGS. 8 and 9, is symmetrical with respect to an imaginary line that connects the pointed edge to the wide edge of the droplet-formed drift detector. Thus the middle electrode strip between the branches is indeed shorter than any of the pair of "adjacent" electrode strips (in quotes because they actually are adjacent only close to their ends). The separation between them branches into two separation branches at each end of the middle electrode strip, and together said separation branches encircle the middle electrode strip save the points where the bridges between electrode strips briefly interrupt the separation branches.

Figure 10:
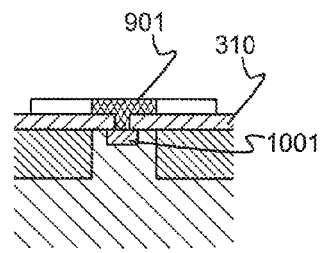
FIG. 10 illustrates a detail of the structure of FIG. 9.

FIG. 10 illustrates an advantageous detail that can be used in all radiation detectors according to embodiments of the invention. With reference to FIG. 9, FIG. 10 is a partial cross section along the two-headed arrow A-A, but a similar structural detail could be found at an arbitrary location of any field plate. FIG. 10 also explains why it was explained earlier that a field plate is isolated from "the most" of the separation by an electric insulation layer Namely, it is advantageous to have, at least one point along the length of a separation and the corresponding field plate, a so-called collection point where the surface-generated charges that have been attracted by the electric potential of the field plate are drawn out of the semiconductor material. The collection point structure illustrated in FIG. 10 comprises a local doped region 1001, which can be e.g. a small n-doped spot, if the electrode strips are p-doped. An electric connection exists between the doped region 1001 and the field plate 901. Here the electric connection has been made by providing an opening in the electric insulation layer 310, so that the metallization that constitutes the field plate 901 will extend through the opening to make contact with the local doped region 1001.

Figure 11:
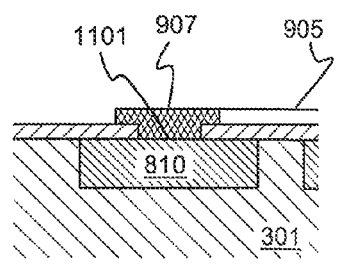
FIG. 11 illustrates another detail of the structure of FIG. 9.

Referring back to FIG. 9, in this embodiment the field plate comprises two sections 903 and 904 separated from each other in the longitudinal direction of the field plate (and of the separation that is otherwise covered by the field plate) by a gap. Correspondingly the hop-over connection comprises two branches 905 and 906, each branch reaching from a common point 907 to an end of the respective section of the field plate, meaning especially that end that is closest to said gap. As is illustrated in more detail in FIG. 11, which is a partial cross section along the two-headed arrow B-B in FIG. 9, the common point 907 is located over and comprises an electric connection 1101 to the electrode strip 810. In the terminology used earlier, electrode strip 810 is that one of the consecutive electrode strips that is further away from the separation 902 than any of the pair of adjacent electrode strips that define said separation. If the electrode strip- and field plate structure is symmetrical with respect to a centerline of the detector, and thus if the other end of the field plate comprises a similar structure, the field plate comprises at its other end a further, third section that is the mirror image of section 904.

A comparison of FIGS. 8 and 9 shows a particular meaning for the two-branched, V-shaped form of the hop-over connection. In the space left in the middle of the two branches 905 and 906 of the hop-over connection shown alone in FIG. 9, further two-branch hop-over connections to outer field plates exist, forming a sequence of nested V's. An alternative way of making the hop-over connections is shown in FIG. 12. It is easy to see that V-shaped hop-over connections of the kind shown in FIGS. 8 and 9 have the advantage of allowing the field plate to extend also to the very end of the separation between the crescent-formed electrode strips.

FIG. 13 illustrates an example of how a field plate may go over a conductive bridge that is used as the resistive connection between two consecutive electrode strips. FIG. 13 shows the outlines of the conductive bridge 806 and the closest edges of the two electrode strips that it links. The hatched region illustrates a field plate that covers the separation between said two electrode strips. As is shown in the drawing, the field plate may simply extend right over the conductive bridge 806 or over at least some portion of it.

FIG. 14 illustrates how an embodiment of the invention can be combined with the use of so-called river structures in a drift detector. A "river" is a radially oriented sequence of discontinuities in consecutive drift electrodes. It allows surface-generated charge carriers to flow from outer separations between electrode strips towards the inner region of the drift detector, where a so-called sink anode can be used to draw them out of the semiconductor material.

In the embodiment shown in FIG. 14 the structure of electrode strips, separations, and field plates follows otherwise the principle described earlier in association with FIG. 7, but at least a number of the electrode strips contain discontinuities. In particular, the illustrated embodiment comprises six discontinuities in each electrode strip, regularly aligned at 60 degrees intervals around the centrally located anode region, so that six radially oriented "rivers" are formed. One "river", parts of which are discontinuities 1401, 1402, and 1403, can be seen in the partial enlargement. Sink anodes 1404 are schematically illustrated as relatively small, dot-formed n-conductivity type implants. Each sink anode is surrounded by a biased implant of the p-conductivity type (here: the sectors of the innermost electrode ring) in order to keep signal charges from being lost to the sink anodes. Stubs 1405 of field plate material extend inwards from the basic circular shape of the field plates on top of the rivers, with the purpose of guiding the surface leakage current flowing in the river under the next inner field plate. Without the stubs 1405 there would be a higher risk of the surface leakage current escaping from the river and mixing with the signal current.

FIG. 15 illustrates an alternative way of aligning the discontinuities. They do not need to constitute a straight, unobstructed linear path in the radial direction, but they can be at different angular locations in different electrode strips, for example so that each discontinuity is aligned with a corresponding hop-over connection. The use of river structures can be combined with the use of field plates and hop-over connections according to an embodiment of the invention irrespective of the form (e.g. round, or droplet) of the drift detector.

Combining the use of river structures with field plates and hop-over connections according to an embodiment of the invention produces significant advantages. If river structures are used without field plates, or with simpler field plates of the kind illustrated in FIG. 4, the collection efficiency of surface-generated charge carriers may remain unsatisfactory. Moreover, it may require that during manufacture, the electric insulation layer is caused to assume a relatively high positive charge (the so-called oxide charge; the insulation layer is typically an oxide layer), in order to ensure that the surface-generated charge carriers remain close to the surface in the rivers. Controllably producing a desired density of positive oxide charge is difficult, and other considerations speak against making the electric insulation layer very positive.

The field plates and hop-over connections ensures that the efficiency of collecting the surface-generated charge carriers is not dependent on the density of the oxide charge. Thus the efficiency of collecting the surface-generated charge carriers is also not dependent on process parameter variations during manufacture, and the optimization of the oxide charge can be made to serve other useful viewpoints.

The exemplary embodiments explained above are not to be construed as limiting the applicability of the appended claims; variations and modification's of the illustrated forms and structures are possible without parting from the scope of protection defined by the claims. For example, the number of intermediate electrode strips over which the hop-over connection goes does not need to be constant, but different hop-over connections even in the same radiation detector may go over different numbers of intermediate electrode strips. The electrode strips may be configured to assume their appropriate electric potentials also through other means than conductive bridges that chain the electrode strips together; for example, a dedicated voltage connection to each electrode strip can be used.

I claim:

1. A radiation detector, comprising:
   a piece of semiconducting material,
   on a surface of said piece of semiconducting material, a number of consecutive electrode strips configured to assume electric potentials of sequentially increasing absolute value,
   a field plate that substantially covers a separation between a pair of adjacent electrode strips of said consecutive electrode strips, and an electric insulation layer between said field plate and said surface of said piece of semiconducting material;
   wherein said field plate is configured to assume a bias potential that is smaller in absolute value than the electric potential of any of said pair of adjacent electrode strips; and wherein the radiation detector further comprises a hop-over connection that electrically couples said field plate to one of said consecutive electrode stripe that is not adjacent to said separation.

2. A radiation detector according to claim 1, wherein said field plate comprises a gap to enable a further hop-over connection to couple a further field plate that covers a further separation between a further pair of adjacent electrode strips of said consecutive electrode strips on one side of said field plate to one of said electrode strips on the other side of said field plate.

3. A radiation detector according to claim 1, comprising:
   a number of consecutive field plates, each of them covering a separation between a respective pair of adjacent electrode strips of said consecutive electrode strips, and
   a hop-over connection for each of said number of consecutive field plates, each hop-over connection coupling a respective field plate to one of said consecutive electrode strips that is not adjacent to the separation covered by the respective field plate;
   wherein each of said hop-over connections is in the same direction with respect to the direction of said sequentially increasing absolute value of electric potentials of said consecutive electrode strips.

4. A radiation detector according to claim 3, wherein each of said hop-over connections reaches over the same number of intermediate electrode strips.

5. A radiation detector according to claim 1, wherein:
   at least one point of said separation comprises a local doped region, and
   an electric connection exists between said doped region and said field plate.

6. A radiation detector according to claim 1, wherein:
   said field plate comprises two sections separated from each other in the longitudinal direction of the field plate by a gap,
   said hop-over connection comprises two bias potential connection branches, each branch reaching from a common point to an end of a different one of said two sections of said field plate defining said gap, and
   said common point is located over and comprises an electric connection to said one of said consecutive electrode strips that is not adjacent to said separation.

7. A radiation detector according to claim 6, wherein:
   in a space left in the middle of said two branches, further two-branch bias potential connections exist forming a sequence of nested V's.

8. A radiation detector according to claim 1, wherein:
   the radiation detector is a droplet-formed drift detector,
   at least some of said electrode strips are crescent-formed field electrodes that partially encircle an anode region of the droplet-formed drift detector.

9. A radiation detector according to claim 1, wherein:
   the radiation detector is a round drift detector,
   at least some of said electrode strips are annular field electrodes that encircle an anode region of the round drift detector.

10. a radiation detector comprising:
    a piece of semiconducting material,
    on a surface of said piece of semiconducting material, a number of consecutive electrode strips configured to assume electric potentials of sequentially increasing absolute value, and a field plate that substantially covers a separation between a pair of adjacent electrode strips of said consecutive electrode strips, and by an electric insulation layer between said field plate and said surface of said piece of semiconducting material;

wherein said field plate is configured to assume a bias potential that is smaller in absolute value than the electric potential of any of said pair of adjacent electrode strips, wherein:

said separation branches into at least two separation branches, between which a further one of said consecutive electrode strips is located, said field plate branches in conformity with the branching separation, so that branches of said field plate cover respective separation branches.

11. A radiation detector according to claim 10, wherein said further one of said consecutive electrode strips is crescent-formed, and wherein said further one of said consecutive electrode strips is shorter than said pair of adjacent electrode strips, so that said separation branches into two separation branches at each end of said further one of said consecutive electrode strips.

12. A method for detecting electromagnetic radiation, comprising:

guiding radiation-induced charge carriers towards a detection point in a piece of semiconducting material with an electric field induced within said piece of semiconducting material by the electric potentials of sequentially increasing absolute value in a number of consecutive electrode strips, and collecting surface-generated charge carriers in a separation between a pair of adjacent ones of said electrode strips with the electric potential of a field plate that covers said separation and is electrically isolated from said separation;

wherein said electric potential of said field plate is smaller in absolute value than the electric potential of any of said pair of adjacent ones of said electrode strips, and wherein said electric potential of said field plate is obtained by electrically coupling said field plate to one of said consecutive electrode strips that is not adjacent to said separation.

* * * * *